United States Patent
Li et al.

(10) Patent No.: US 10,566,855 B2
(45) Date of Patent: Feb. 18, 2020

(54) PERMANENT MAGNET DIRECT CURRENT MOTOR AND HVAC SYSTEM USING THE SAME

(71) Applicant: Johnson Electric S.A., Murten (CH)

(72) Inventors: Yue Li, Hong Kong (CN); James Ching Sik Lau, Hong Kong (CN); Chui You Zhou, Shenzhen (CN); Gang Li, Shenzhen (CN); Xiao Ning Zhu, Shenzhen (CN); Ya Ming Zhang, Shenzhen (CN); Yong Gang Zhang, Shenzhen (CN)

(73) Assignee: Johnson Electric International AG, Murten (CH)

( * ) Notice: Subject to any disclaimer, the term of this patent is extended or adjusted under 35 U.S.C. 154(b) by 316 days.

(21) Appl. No.: 15/611,157

(22) Filed: Jun. 1, 2017

(65) Prior Publication Data

US 2017/0366054 A1    Dec. 21, 2017

(30) Foreign Application Priority Data

Jun. 17, 2016   (CN) .......................... 2016 1 0439168

(51) Int. Cl.
| | |
|---|---|
| *H02K 1/17* | (2006.01) |
| *H02K 1/24* | (2006.01) |
| *H02K 3/18* | (2006.01) |
| *H02K 13/10* | (2006.01) |
| *H02K 23/62* | (2006.01) |

(52) U.S. Cl.
CPC ................. *H02K 1/17* (2013.01); *H02K 1/24* (2013.01); *H02K 3/18* (2013.01); *H02K 13/10* (2013.01); *H02K 23/62* (2013.01); *H02K 2213/03* (2013.01)

(58) Field of Classification Search
CPC ...... H02K 1/17; H02K 2213/03; H02K 13/10; H02K 23/04; H01R 39/38–39/44
See application file for complete search history.

(56) References Cited

U.S. PATENT DOCUMENTS

| | | | | |
|---|---|---|---|---|
| 8,633,626 | B2 * | 1/2014 | Miyajima | .............. H02K 23/04 310/154.22 |
| 2002/0050759 | A1 * | 5/2002 | Shiraki | .................. H02K 5/145 310/239 |
| 2012/0299427 | A1 * | 11/2012 | He | ......................... H02K 23/00 310/154.28 |

FOREIGN PATENT DOCUMENTS

JP    59050750 A  *  3/1984  ............. H02K 5/145

* cited by examiner

*Primary Examiner* — Ramon M Barrera
(74) *Attorney, Agent, or Firm* — Muncy, Geissler, Olds & Lowe, P.C.

(57) ABSTRACT

A PMDC motor includes a housing, a stator magnet fixed to the inner circumferential surface of the housing, a rotor core received in the housing and facing the stator magnet, and rotor windings wound around the rotor core. The rotor core includes a plurality of rotor teeth, each of the rotor teeth including a tooth body and a tooth tip. A ratio of the outer diameter of the rotor core to an outer diameter of the housing is in the range of 0.6 to 0.67. Compared to the existing PMDC motor, the PMDC motor of the present invention can satisfy the same performance requirement, while reducing the size and weight of the rotor core and hence the weight of the rotor windings. In this way, the total weight and hence the moment of inertia of the rotor is reduced, thereby effectively reducing the noise generated during operation of the motor.

16 Claims, 9 Drawing Sheets

| motor | Noise(dBA) | |
|---|---|---|
| | CW | CCW |
| 1 | 24.7 | 25.1 |
| 2 | 28.8 | 28.3 |
| 3 | 26.8 | 27.8 |
| 4 | 30.5 | 29.5 |
| 5 | 25.1 | 25.1 |
| Average | 27.18 | 27.16 |

FIG. 9

| motor | Noise(dBA) | |
|---|---|---|
| | CW | CCW |
| 1 | 16.5 | 15.9 |
| 2 | 21.5 | 21.3 |
| 3 | 19 | 16.9 |
| 4 | 19 | 16.7 |
| 5 | 20.9 | 20.5 |
| Average | 19.38 | 18.26 |

FIG. 10

PERMANENT MAGNET DIRECT CURRENT MOTOR AND HVAC SYSTEM USING THE SAME

CROSS REFERENCE TO RELATED APPLICATIONS

This non-provisional patent application claims priority under 35 U.S.C. § 119(a) from Patent Application No. 201610439168.1 filed in The People's Republic of China on Jun. 17, 2016.

FIELD OF THE INVENTION

The present invention relates to the field of motor, and in particular to a permanent magnet direct current motor.

BACKGROUND OF THE INVENTION

Motors are devices that convert electric energy into mechanical energy according to the law of electromagnetic induction, and can be divided into direct current motors and alternating current motors.

A permanent magnet direct current (PMDC) motor is a direct current motor that uses a permanent magnet to create magnetic field. The PMDC motor is widely used in various portable electronic devices or appliances, such as a recorder, a VCD player, an electric gramophone, an electric massager and various toys, and also widely used in automobiles, motorcycles, electric bicycles, battery cars, ships, aviation, machinery and other industries.

With the development of the motor technology, the PMDC motors have been more widely used. The permanent magnet direct current motors will replace the alternating current motors in many applications.

However, different application fields have different requirements for performance of the permanent magnet direct current motors. For example, in a heating, ventilation and air conditioning (HVAC) system, the PMDC motor is used to inject fresh air into a compartment, and is required to have a low noise. FIG. 8 shows an existing PMDC motor used in the HVAC system for automobiles, which includes a housing 100, a stator magnet 200 fixed to an inner surface of the housing 100, and a rotor core 300 disposed in the stator magnet 200. The rotor core 300 includes teeth 301. Windings 302 are wound around the teeth 301. In this permanent magnet direct current motor, a thickness of the stator magnet 200 is relatively small, an outer diameter of the rotor core 300 is relatively large, which is 17.9 mm, and a tooth width of the teeth 301 of the rotor core 300 is also as wide as 4.2 mm. Therefore, the rotor core 300 has a large moment of inertia of the rotor core 300 and can easily produce noise, which cannot satisfy customers' demand for low noise of the automobile HVAC systems.

Hence, it is necessary to improve the existing PMDC motor, so as to effectively reduce the noise generated by the PMDC motor during operation to improve quality of the motor.

SUMMARY OF THE INVENTION

Thus, there is a desire for a PMDC motor with reduced noise during operation thereof.

A PMDC motor is provided which includes a housing with an inner circumferential surface; a stator magnet fixed to the inner circumferential surface of the housing; a rotor core received in the housing and facing the stator magnet, the rotor core comprising a plurality of rotor teeth, each of the rotor teeth comprising a tooth body and a tooth tip, a ratio of the outer diameter of the rotor core to an outer diameter of the housing being in the range of 0.6 to 0.67; and rotor windings wound around the rotor core.

Preferably, the stator magnet is made of a rubber magnet and a ratio of the outer diameter of the rotor core to a thickness of the stator magnet is in the range of 4.6 to 5.6.

Preferably, the rubber magnet has a thickness of 2.90 mm to 3.45 mm and has a maximum magnetic energy product of 1.50 MGOe to 1.75 MGOe.

Preferably, the rubber magnet has a thickness of 3.1 mm.

Preferably, the rubber magnet is rolled into a cylindrical shape and then is fixed within the housing by press fit.

Preferably, the tooth body of each of the rotor teeth has a tooth height in a radial direction of the rotor core, and a ratio of the tooth height to the outer diameter of the rotor core is in the range of 0.25 to 0.5.

Preferably, the tooth body has a width in a circumferential direction of the rotor core, a ratio of the width of the tooth body to the outer diameter of the rotor core being in the range of 0.1 to 0.2.

Preferably, the outer diameter of the rotor core is 15.8 mm and the outer diameter of the housing is 24.4 mm.

Preferably, the width of the tooth body of each of the rotor teeth in the circumferential direction of the rotor core is 2.3 mm and the tooth height of the tooth body of each of the rotor teeth in the radial direction of the rotor core is 3.29 mm.

Preferably, an air gap is defined between the rotor core and the stator magnet, and the air gap is in the range of 0.2 mm to 0.35 mm.

Preferably, further comprising a cover disposed on the housing and an endcap disposed at an outside of the cover.

Preferably, the cover is provided with a plurality of protruding posts and bosses, a plurality of through holes and positioning grooves are defined in the endcap, corresponding to the protruding posts and the bosses, respectively, the protruding posts and the bosses engage in the through holes and the positioning grooves, respectively, to fix the cover to the endcap.

Preferably, the housing is a cylindrical structure comprising a closed end with a bottom portion and an open end without bottom portion, and the cover and the endcap cover the open end of the housing.

Preferably, a bearing mounting portion is provided at each of the endcap and the bottom portion of the housing for mounting a bearing, and the rotor further comprises a rotary shaft fixed with the rotor core and mounted to the bearing mounting portion via the bearing.

Preferably, the rotor further comprises a rotary shaft and a commutator disposed on the rotary shaft, a pair of carbon brushes fixed to the cover, and conductive terminals disposed on the cover or the endcap, the commutator comprising a plurality of commutator segments, one end of the carbon brush being fixedly connected to the conductive terminals, and the other end of the carbon brush being in slide contact with the commutator segments of the commutator.

Preferably, each of the carbon brushes comprises a brush plate and a vibration absorbing plate disposed on the brush plate.

Preferably, fixing connection points between the carbon brush and the conductive terminals are located on a diameter through a center of the cover or the endcap.

The present invention further provides an HVAC system for a vehicle, wherein the HVAC system comprises a permanent magnet direct current motor described above.

Compared to traditional PMDC motor, the PMDC motor of the present invention adopts a size reduced rotor and a thickness increased magnet which effectively reduce noise during operation.

BRIEF DESCRIPTION OF THE DRAWINGS

The present invention is described below in greater detail with reference to the drawings and embodiments.

FIG. 9 represents the test data of the existing permanent magnet direct current motor.

FIG. 10 represents the test data of the permanent magnet direct current motor of the embodiment of the present invention.

DETAILED DESCRIPTION OF THE PREFERRED EMBODIMENTS

Figure 1:
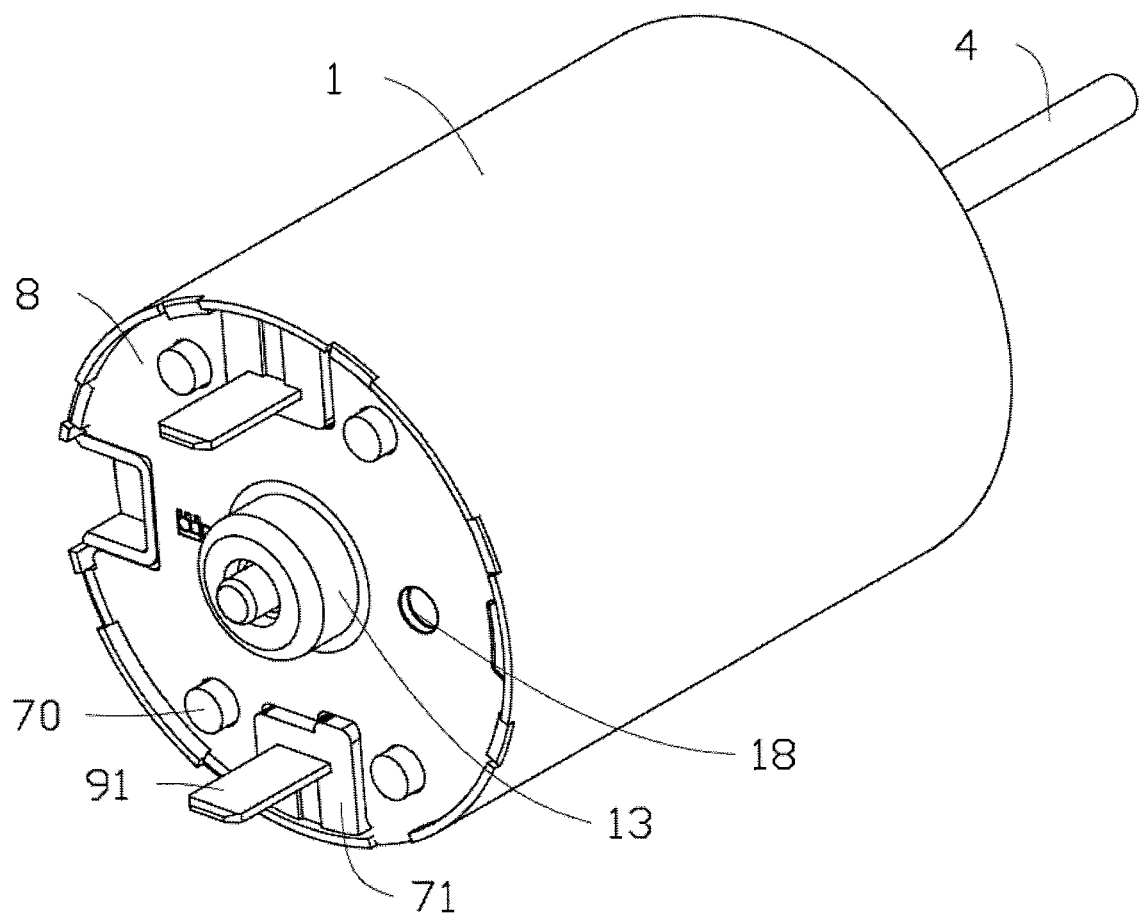
FIG. 1 is a perspective view of a permanent magnet direct current motor according to one embodiment of the present invention.
Figure 2:
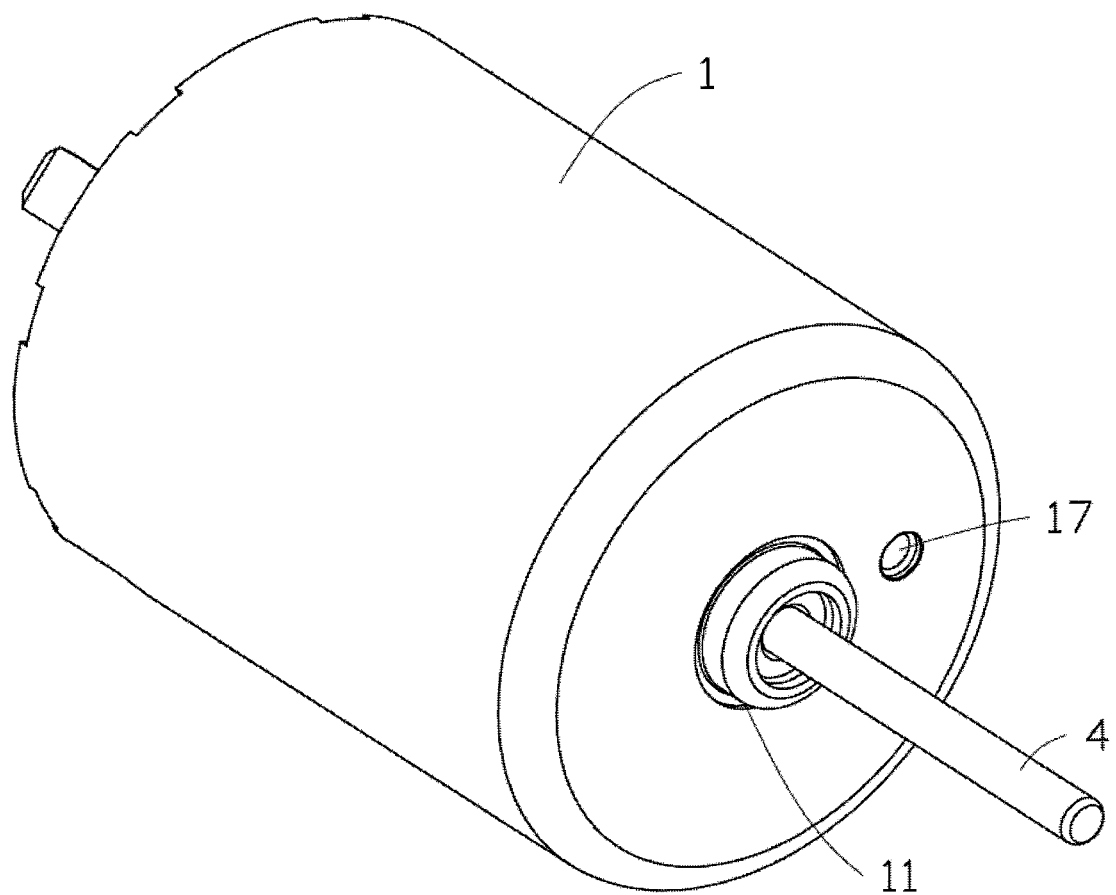
FIG. 2 is a perspective view of the permanent magnet direct current motor shown in FIG. 1, viewed from another aspect.
Figure 3:
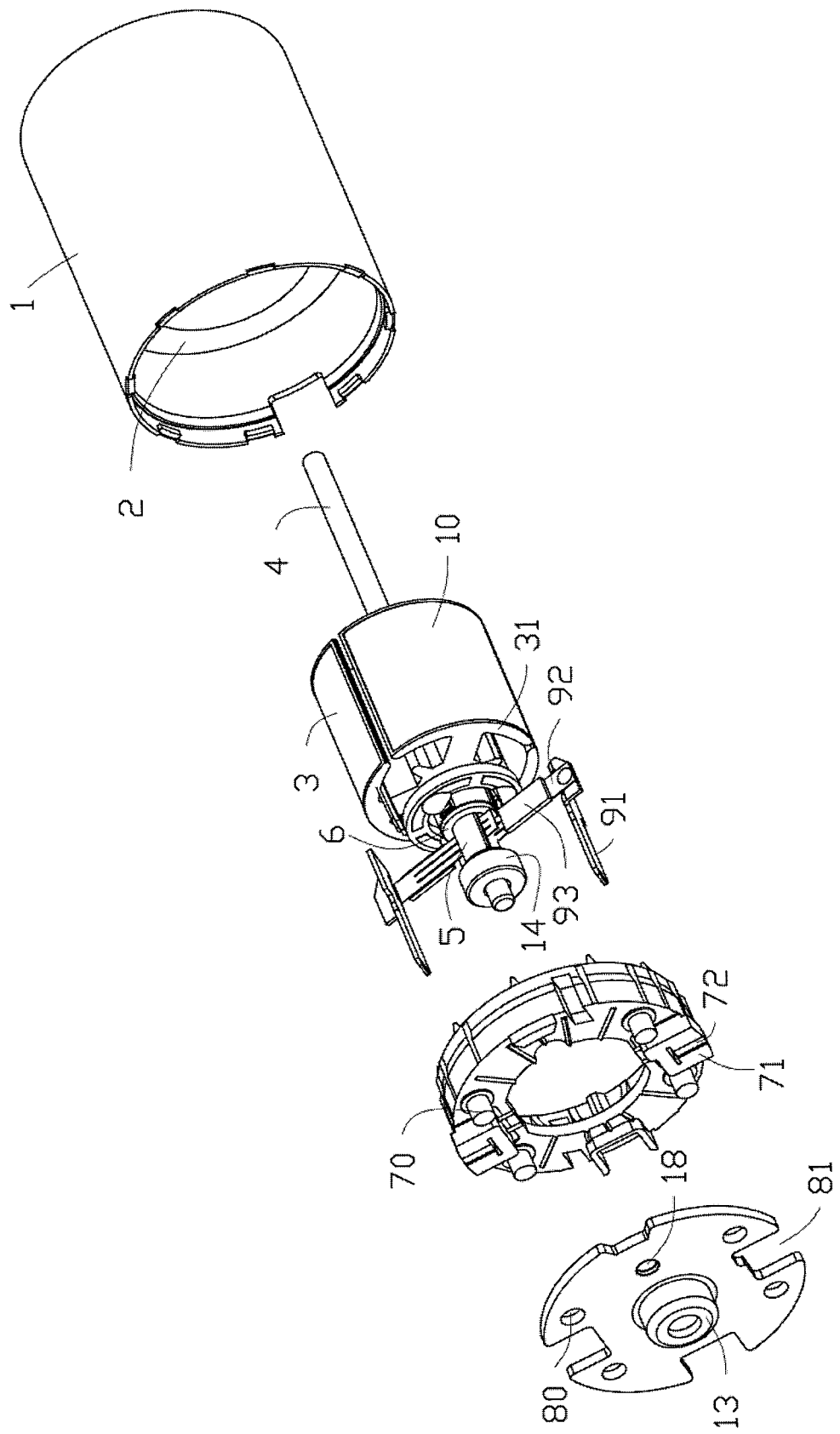
FIG. 3 is an exploded view of the permanent magnet direct current motor shown in FIG. 1.
Figure 4:
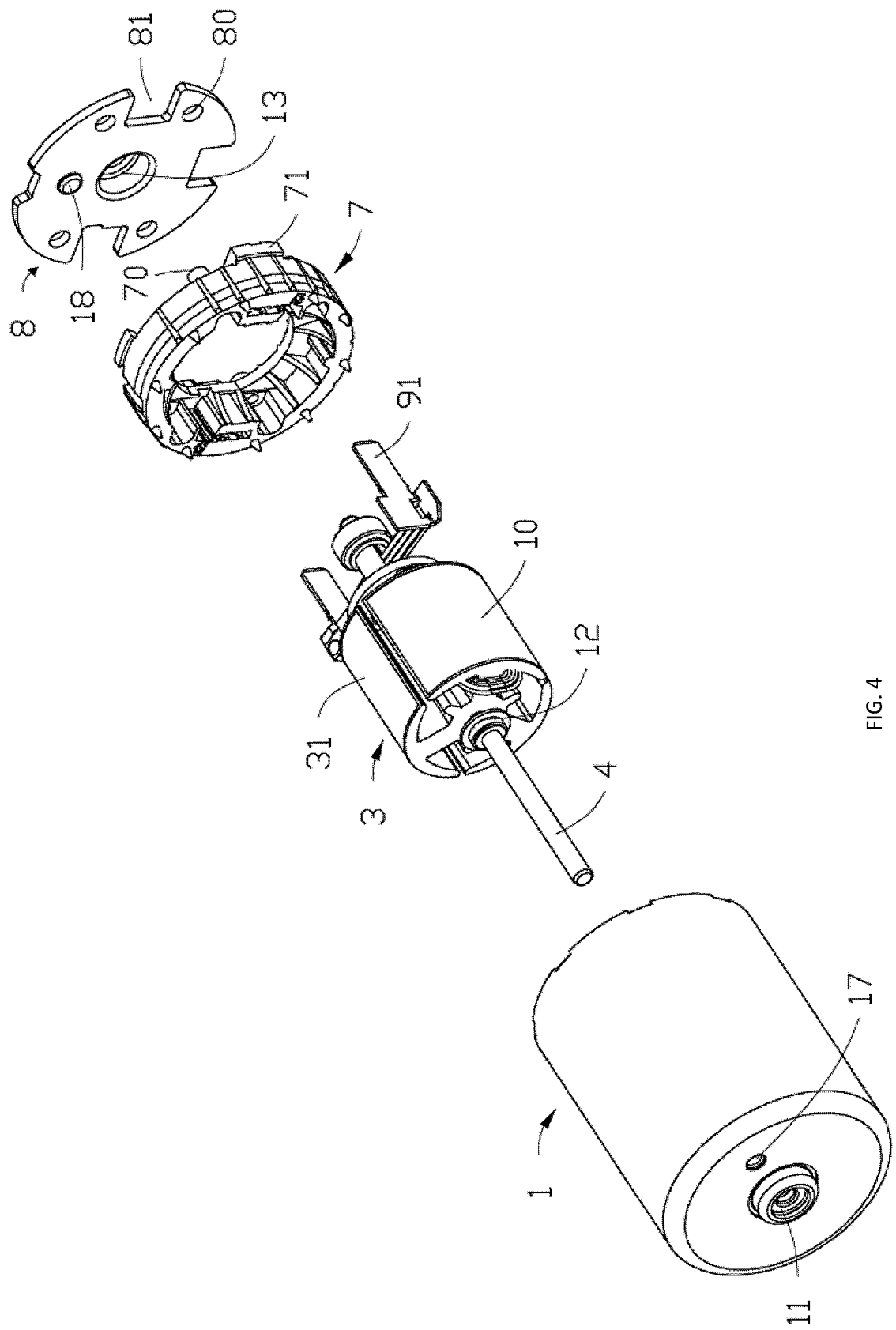
FIG. 4 is an exploded view of the permanent magnet direct current motor shown in FIG. 1, viewed from another aspect.

Below, embodiments of the present invention will be described in greater detail with reference to the drawings. Elements of similar structures or functions are generally represented by like reference numerals for illustrative purposes throughout the figures. It should be noted that the figures are illustrative rather than limiting. The figures are not drawn to scale, do not illustrate every aspect of the described embodiments, and do not limit the scope of the present disclosure. Unless otherwise specified, all technical and scientific terms used in this disclosure have the ordinary meaning as commonly understood by people skilled in the art.

It is noted that, when a component is described to be "fixed" to another component, it can be directly fixed to the another component or there may be an intermediate component. When a component is described to be "connected" to another component, it can be directly connected to the another component or there may be an intermediate component. When a component is described to be "disposed" on another component, it can be directly disposed on the another component or there may be an intermediate component.

Referring to FIG. 1 to FIG. 7, the present invention provides a micro PMDC motor, which, preferably, can be used in a heating, ventilation and air conditioning (HVAC) system for an automobile. The motor includes a housing 1, a stator magnet 2 disposed in the housing 1, a rotor core 3 opposed to the stator magnet 2, rotor windings 302 (FIG. 8) wound around the rotor core 3, a rotary shaft 4 fixed to and driven by the rotor core 3, a commutator 6 disposed at the rotary shaft 4 and including a plurality of commutator segments 5, a cover 7 disposed at an end of the housing 1, an endcap 8 disposed at an outside of the cover 7, and carbon brushes 9 fixed to the cover 7. A ratio of an outer diameter D1 of the rotor core 3 to an outer diameter D2 of the housing 1 is in the range of 0.6 to 0.67.

Figure 5:
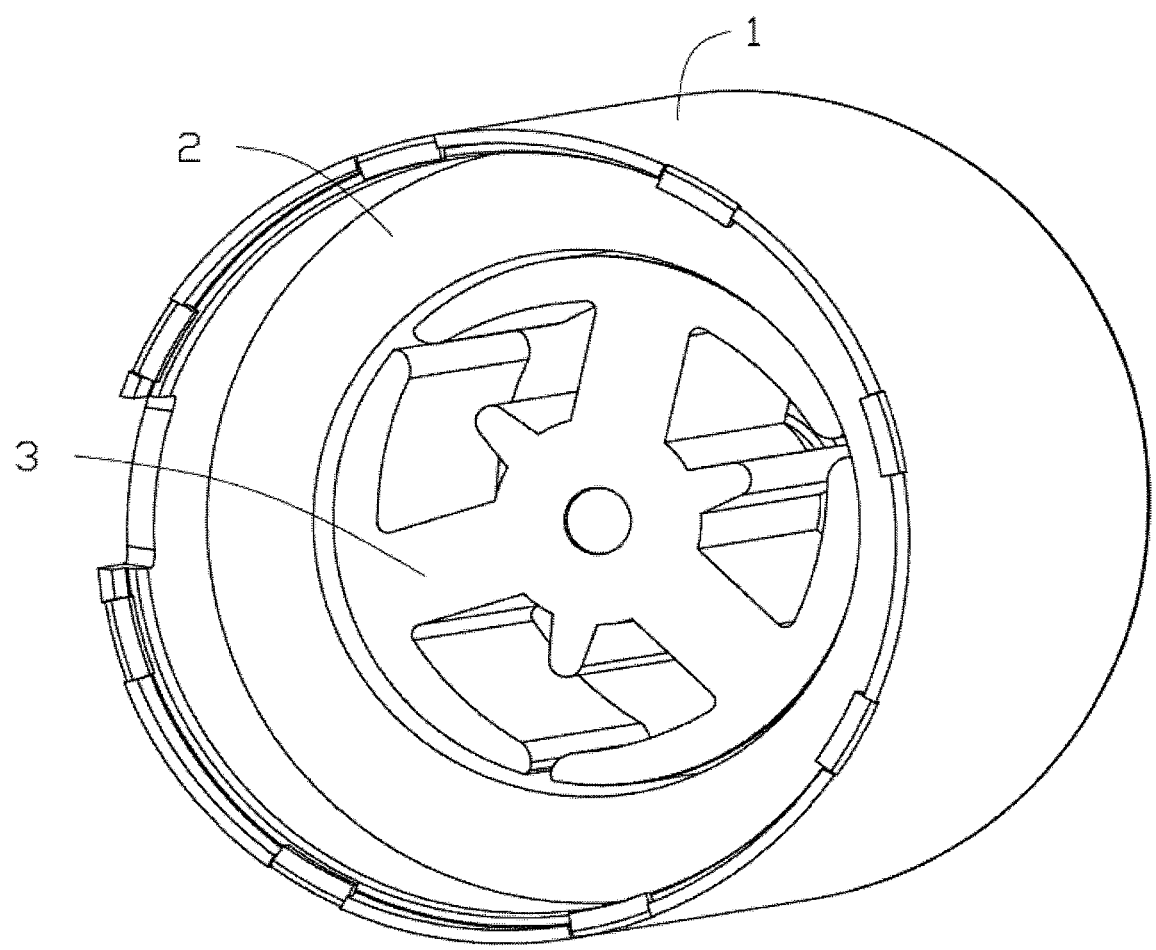
FIG. 5 is a perspective view of a stator, a stator core and a rotor core of the permanent magnet direct current motor shown in FIG. 1.
Figure 6:
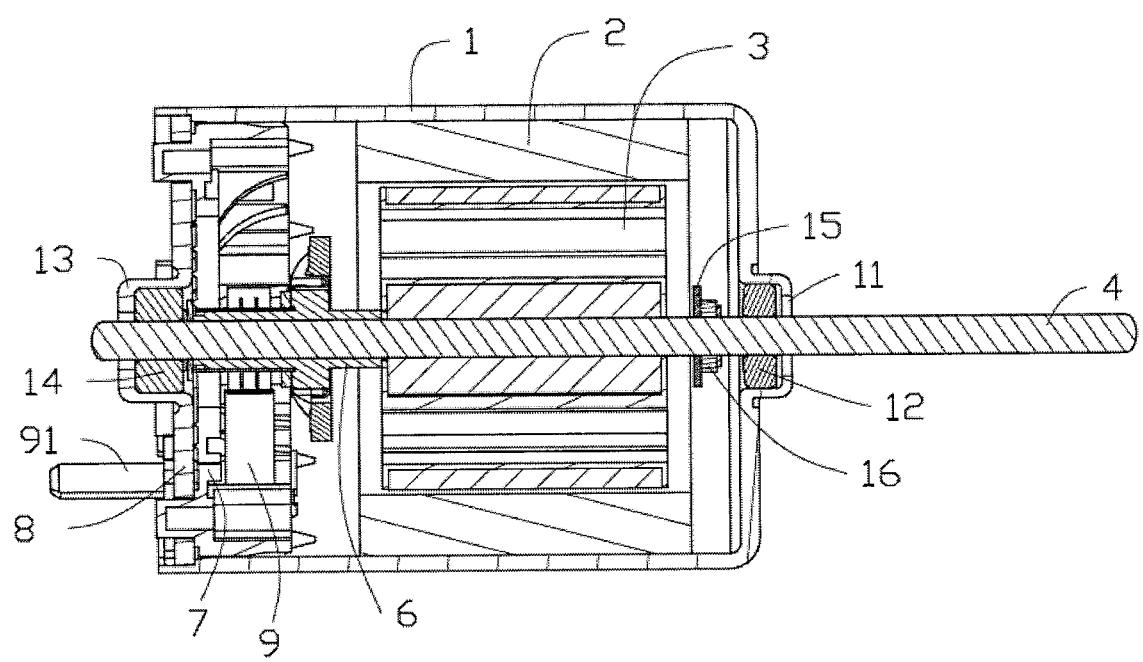
FIG. 6 is a sectional view of the permanent magnet direct current motor shown in FIG. 1.
Figure 7:
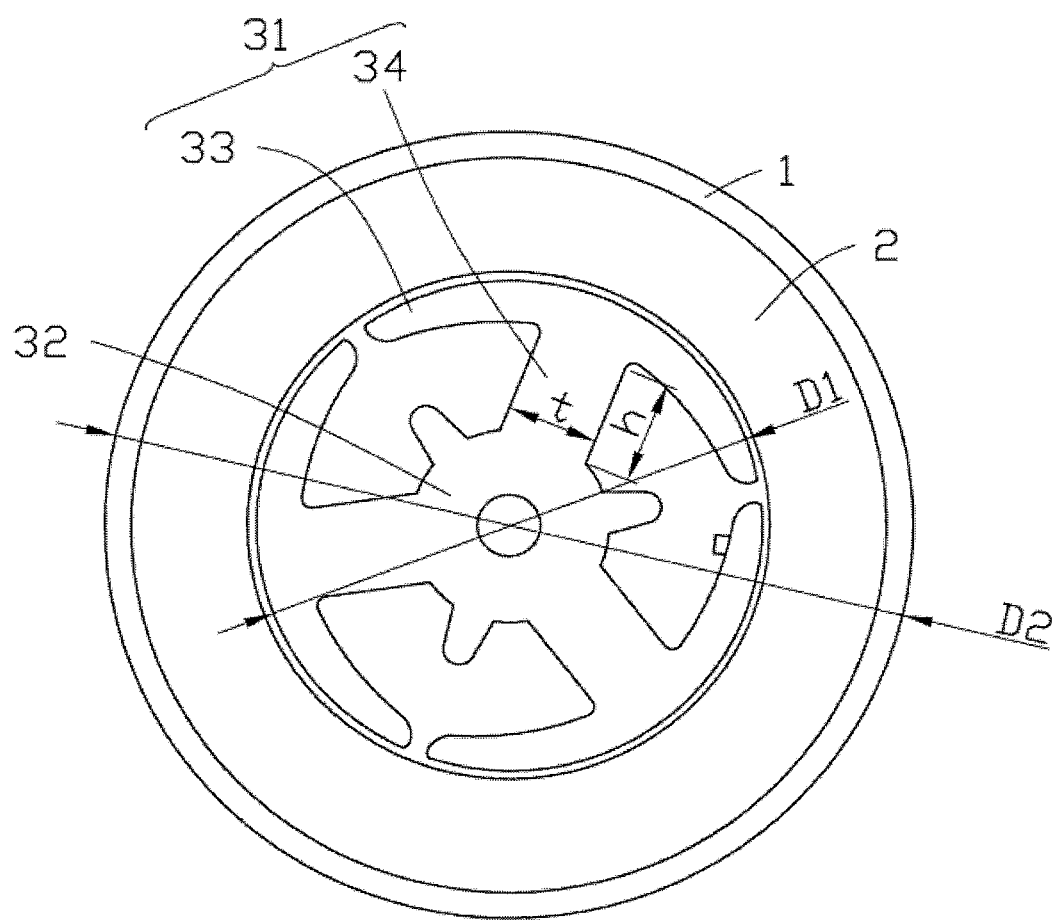
FIG. 7 is a sectional view of the stator, the stator core and the rotor core of the permanent magnet direct current motor shown in FIG. 1.
Figure 8:
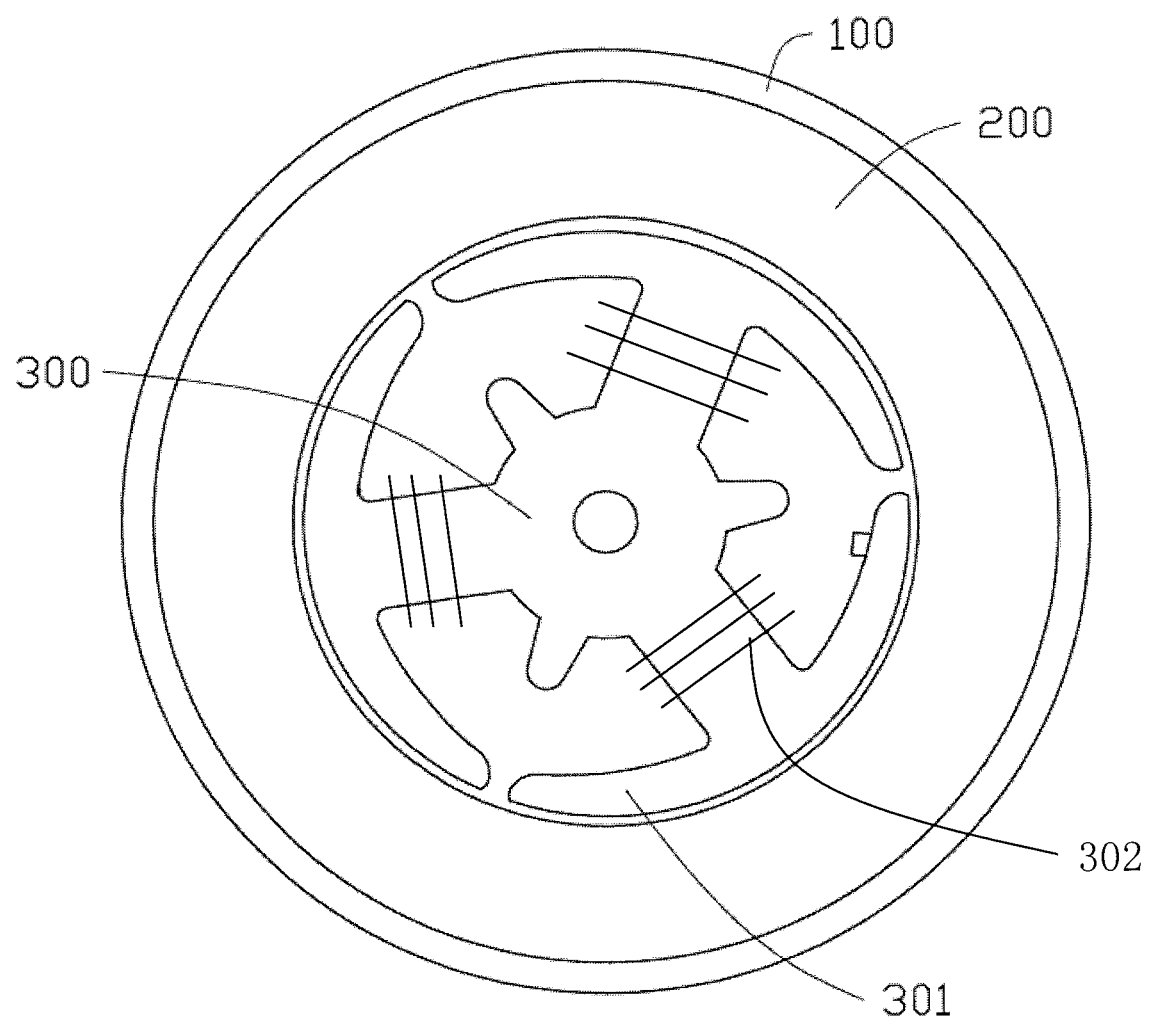
FIG. 8 is a sectional view of a stator, a stator core and a rotor core of an existing permanent magnet direct current motor.

Referring to FIG. 5 and FIG. 7, in the PMDC motor of one embodiment of the present invention, the rotor core 3 has a relatively smaller outer diameter, thereby reducing the moment of inertia of the rotor core 3 and hence effectively reducing the noise of the permanent magnet direct current motor during a working process. In one embodiment, the stator magnet 2 is formed by a rubber magnet having a thickness of 2.90 mm to 3.45 mm and having a maximum energy product of 1.50 MGOe to 1.75 MGOe, which is rolled into a cylindrical shape and then is fixed within the housing 1 by means of press fit.

Referring also to FIG. 3 to FIG. 6, an insulation glue 10 is coated at two ends and grooves of the rotor core 3, and the rotary shaft 4 extends through a center of the rotor core 3, with two ends of the rotary shaft 4 respectively supported by the housing 1 and the endcap 8 and capable of rotating together with the rotor core 3 relative to the housing 1 and the endcap 8. Specifically, the housing 1 is a cylindrical structure comprising a closed end with a bottom portion and an open end without bottom portion. A bearing mounting portion 11 is provided at the bottom portion of the housing 1 for mounting a bearing 12. The cover 7 preferably made of plastic and the endcap 8 preferably made of metal are disposed at the open end of the housing 1 in order to cover the open end of the housing 1. A bearing mounting portion 13 is also provided at the endcap 18, for mounting a bearing 14. The rotary shaft 4 is rotatably mounted in the housing 1 and the endcap 8 through the bearings 12, 14, respectively. An end of the rotary shaft 4 supported by the bearing 12 extends through the bearing 12 to an outside of the housing 1, for driving a driven member. A positioning ring 15 is disposed at an outside of an end of the rotor core 3 facing the bearing 12, and a washer 16 is disposed between the positioning ring 15 and the bearing 12.

In the illustrated embodiment, the rotor core 3 includes three rotor teeth 31, and the rotor windings 302 (see FIG. 8) are wound around the rotor teeth 31. The commutator 6 includes three commutator segments 5. Distal ends of the windings 302 are in electric connection with corresponding commutator segments 5 so that the windings are connected to an external power source through the commutator 6, the carbon brush 9 and conductive terminals 91. A plurality of protruding posts 70 and bosses 71 are provided at an end surface of the cover 7. A plurality of through holes 80 and positioning grooves 81 are defined in the endcap 8, corresponding to the protruding posts 70 and the bosses 71, respectively. The protruding posts 70 and the bosses 71 of the cover 7 engage with the through holes 80 and the positioning grooves 81 of the endcap 8, respectively, to fix the cover 7 to the endcap 8. The cover 7 and the endcap 8 protect internal structures of the motor.

Further, in the illustrated embodiment, a mounting groove 72 is defined in each boss 71 of the cover 7. The carbon brush 9 is elastic-sheet-type carbon brush, which includes conductive terminals 91 disposed in the mounting grooves 72, brush plates 92 substantially perpendicularly connected to the conductive terminals 91, and vibration-absorbing plates 93 disposed on the brush plates 92. The brush plates 92 are in slide contact with the commutator segments 5 of the commutator 6. Fixing connection points between the brush plates 92 and the two conductive terminals 91 are located on a diameter through a center of the cover 7. The conductive terminals 91 extend to an outside of the encap 8 through the mounting grooves 72 for connecting with the external power source. In another embodiment, the conductive terminals may also be disposed on the endcap 8.

A first heat dissipation hole 17 is defined through an outer surface of the bottom portion of the housing 1, and a second heat dissipation hole 18 is defined through an outer surface of the endcap 8. The heat inside the motor can be dissipated through the first heat dissipation hole 17 and the second heat dissipation hole 18.

Referring to FIG. 7, in the PMDC motor of one embodiment of the present invention, a ratio of an outer diameter D1 of the rotor core 3 to an outer diameter D2 of the housing 1 is in the range of 0.6 to 0.67. The rotor core 3 comprises a ring portion 32 and a tooth portion 31 protruding from the ring portion 32. The tooth portion 31 includes a tooth tip 33 and a tooth body 34 located between the ring portion 32 and the tooth tip 33. The tooth body 34 has a width t in a circumferential direction, and a ratio of the tooth width t to the outer diameter D1 of the rotor core 3 is in the range of 0.1 to 0.2. The tooth body 34 has a tooth height h in a radial direction, and a ratio of the tooth height h to the outer diameter D1 of the rotor core 3 is in the range of 0.25 to 0.5. In a particular embodiment, the outer diameter D1 of the rotor core 3 is 15.8 mm, the tooth width t of the tooth body 34 in the circumferential direction of the rotor core 3 is 2.3 mm, and the tooth height h of the tooth body 34 in the radial direction of the rotor core 3 is 3.29 mm. In addition, the stator magnet 2 has a thickness of 3.1 mm and a maximum magnetic energy product of 1.50 MGOe to 1.75 MGOe. The ratio of the outer diameter D1 of the rotor core 3 to the thickness of the stator magnet 2 is in the range of 4.6 to 5.6, preferably 5.0 to 5.2. An air gap between the stator magnet 2 and the rotor core 3 is in the range of 0.2 mm to 0.35 mm.

As configured above, in comparison with the existing PMDC motor, the PMDC motor of the embodiment of the present invention can satisfy the same performance requirement, while reducing the size and weight of the rotor core and hence the weight of the rotor windings. In this way, the total weight and hence the moment of inertia of the rotor is reduced, thereby effectively reducing the noise generated by the motor during operation of the motor. Furthermore, the total weight and the total cost of the motor are accordingly reduced.

Noise tests were performed with respect to the existing PMDC motor and the PMDC motor of the embodiment of the present invention, and the resulted test data is shown in FIGS. 9 and 10, where FIG. 9 represents the test data of the existing permanent magnet direct current motor, and FIG. 10 represents the test data of the permanent magnet direct current motor of the embodiment of the present invention. As can be seen from the comparison, no matter in a forward rotating state or a backward rotating state, the noise of the PMDC motor of the embodiment of the present invention is lower than the noise of the existing PMDC motor.

In summary, in the PMDC motor of the present invention, by means of reducing the outer diameter of the rotor core and the width of the tooth body as well as the ratio of the height of the tooth body of the rotor tooth to the outer diameter of the rotor core within optioned ranges, the number of turns of the windings wound around the tooth body is increased, which thus increases a length of coils cutting magnetic field lines of the stator magnet. In addition, by designing the suitable stator magnet and air gap, under the premise of satisfying the performance requirement, the moment of inertia of the rotor core is reduced, and the noise generated by the permanent magnet direct current motor during working process is effectively reduced, thereby improving the quality of the PMDC motor and satisfying customers' demand for low noise of the automobile HVAC system.

Although the invention is described with reference to one or more embodiments, the above description of the embodiments is used only to enable people skilled in the art to practice or use the invention. It should be appreciated by those skilled in the art that various modifications are possible without departing from the spirit or scope of the present invention. The embodiments illustrated herein should not be interpreted as limits to the present invention, and the scope of the invention is to be determined by reference to the claims that follow.

The invention claimed is:

1. A permanent magnet direct current motor comprising:
   a housing with an inner circumferential surface;
   a stator magnet fixed to the inner circumferential surface of the housing;
   a rotor core received in the housing and facing the stator magnet, the rotor core comprising a plurality of rotor teeth, each of the rotor teeth comprising a tooth body and a tooth tip, a ratio of the outer diameter of the rotor core to an outer diameter of the housing being in the range of 0.6 to 0.67; and
   rotor windings wound around the rotor core,
   wherein the stator magnet is made of a rubber magnet and a ratio of the outer diameter of the rotor core to a thickness of the stator magnet is in the range of 4.6 to 5.6, and
   wherein the rubber magnet has a thickness of 2.90 mm to 3.45 mm and has a maximum magnetic energy product of 1.50 MGOe to 1.75 MGOe.

2. The permanent magnet direct current motor of claim 1, wherein the rubber magnet has a thickness of 3.1 mm.

3. The permanent magnet direct current motor of claim 1, wherein the rubber magnet is rolled into a cylindrical shape and then is fixed within the housing by press fit.

4. The permanent magnet direct current motor of claim 1, wherein the tooth body of each of the rotor teeth has a tooth height in a radial direction of the rotor core, and a ratio of the tooth height to the outer diameter of the rotor core is in the range of 0.25 to 0.5.

5. The permanent magnet direct current motor of claim 1, wherein the tooth body has a width in a circumferential direction of the rotor core, a ratio of the width of the tooth body to the outer diameter of the rotor core being in the range of 0.1 to 0.2.

6. The permanent magnet direct current motor of claim 1, wherein the outer diameter of the rotor core is 15.8 mm and the outer diameter of the housing is 24.4 mm.

7. The permanent magnet direct current motor of claim 6, wherein the width of the tooth body of each of the rotor teeth in the circumferential direction of the rotor core is 2.3 mm and the tooth height of the tooth body of each of the rotor teeth in the radial direction of the rotor core is 3.29 mm.

8. The permanent magnet direct current motor of claim 1, wherein an air gap is defined between the rotor core and the stator magnet, and the air gap is in the range of 0.2 mm to 0.35 mm.

9. The permanent magnet direct current motor of claim 1, further comprising a cover disposed on the housing and an endcap disposed at an outside of the cover.

10. The permanent magnet direct current motor of claim 9, wherein the cover is provided with a plurality of protruding posts and bosses, a plurality of through holes and positioning grooves are defined in the endcap, corresponding to the protruding posts and the bosses, respectively, the protruding posts and the bosses engage in the through holes and the positioning grooves, respectively, to fix the cover to the endcap.

11. The permanent magnet direct current motor of claim 9, wherein the housing is a cylindrical structure comprising a closed end with a bottom portion and an open end without bottom portion, and the cover and the endcap cover the open end of the housing.

12. The permanent magnet direct current motor of claim 11, wherein a bearing mounting portion is provided at each of the endcap and the bottom portion of the housing for mounting a bearing, and the rotor further comprises a rotary shaft fixed with the rotor core and mounted to the bearing mounting portion via the bearing.

13. The permanent magnet direct current motor of claim 9, further comprising a rotary shaft and a commutator disposed on the rotary shaft, a pair of carbon brushes fixed to the cover, and conductive terminals disposed on the cover or the endcap, the commutator comprising a plurality of commutator segments, one end of the carbon brush being fixedly connected to the conductive terminals, and the other end of the carbon brush being in slide contact with the commutator segments of the commutator.

14. The permanent magnet direct current motor of claim 13, wherein each of the carbon brushes comprises a brush plate and a vibration absorbing plate disposed on the brush plate.

15. The permanent magnet direct current motor of claim 14, wherein fixing connection points between the carbon brush and the conductive terminals are located on a diameter through a center of the cover or the endcap.

16. An HVAC system for a vehicle, wherein the HVAC system comprises a permanent magnet direct current motor of claim 1.

* * * * *